A. MOSCA.
SUPPORT FOR AIR PUMPS OF BICYCLES AND LIKE VEHICLES.
APPLICATION FILED DEC. 10, 1920.
1,385,260.
Patented July 19, 1921.
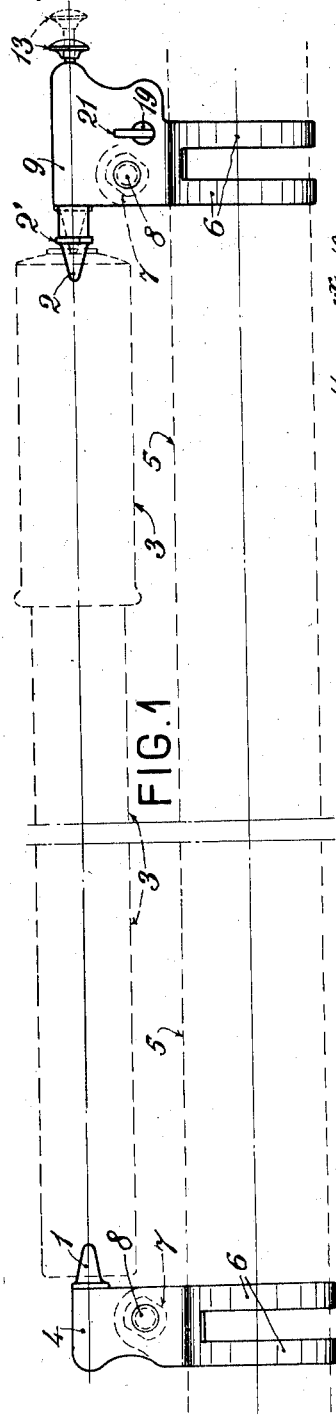
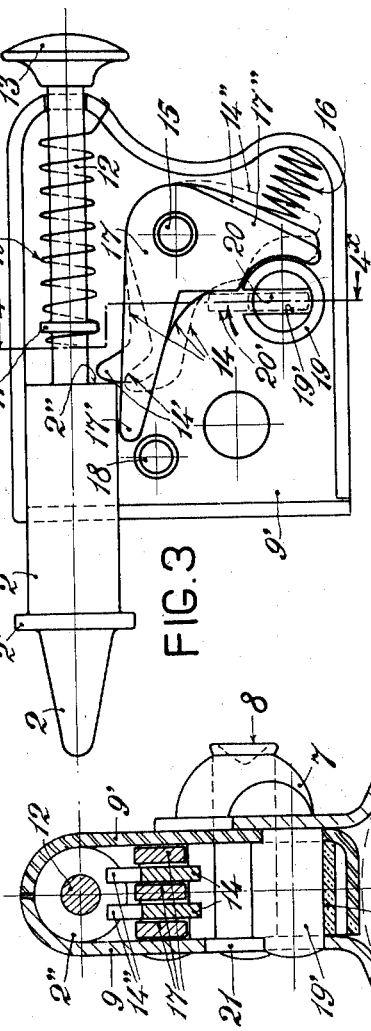
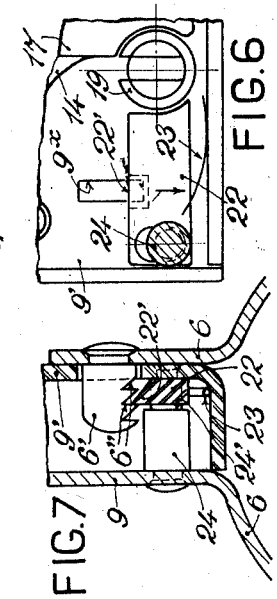
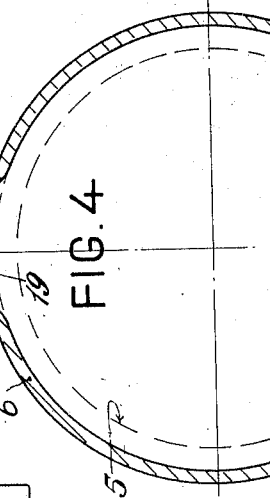
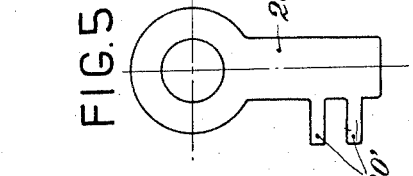
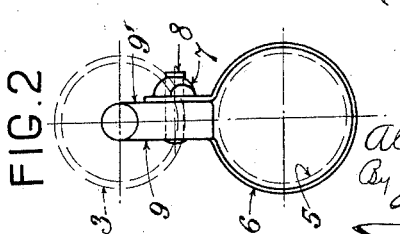

UNITED STATES PATENT OFFICE.

ALESSANDRO MOSCA, OF TURIN, ITALY.

SUPPORT FOR AIR-PUMPS OF BICYCLES AND LIKE VEHICLES.

1,385,260.

Specification of Letters Patent. Patented July 19, 1921.

Application filed December 10, 1920. Serial No. 429,794.

*To all whom it may concern:*

Be it known that I, ALESSANDRO MOSCA, a subject of the King of Italy, residing at Turin, Italy, have invented certain new and useful Improvements in and Relating to Supports for Air-Pumps of Bicycles and like Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The arrangement used up to the present for holding the air pumps for tires of bicycles and the like consists of a fixed center and of a movable lock having its end point shaped. The pump is mounted between the said members and is usually arranged on a tube of the frame of the bicycle and held in position under the action of a spring which has a tendency to maintain the lock in its locking position.

The pump thus supported may be easily removed by sliding it axially in such a manner as to overcome the reaction of the spring of the locking device until it is disengaged from the fixed center. That is why the supporting arrangements which have been hitherto proposed do not offer any stability nor any guarantee against theft.

The present invention has for its object an arrangement for carrying the pump, characterized in this that the fixing bolt is placed under the control of a lock and can be opened only by means of a suitable key for operating the mechanism of the lock itself. The present supporting arrangement is further characterized by the peculiar shape of the locking mechanism and by other details of construction as hereinafter more particularly referred to.

One mode of carrying the invention into effect has been illustrated by way of example only in the accompanying drawings, in which, Figures 1 and 2 are respectively a side elevation and an end view of the supporting arrangements.

Fig. 3 is a longitudinal section at a larger scale of the bolt and the locking mechanism.

Fig. 4 is a transverse section along the line —4$^x$, 4$^x$— of Fig. 3.

Fig. 5 shows the key of the locking mechanism.

Figs. 6 and 7 show in detail a longitudinal and transverse section of a modification of the mode of fixation of the elements of the supporting device to the tube of the frame of the bicycle.

The supporting arrangement according to the present invention comprises (see Fig. 1) a fixed center 1 and a movable lock 2 having its end point shaped, the pump 3 being mounted between the center 1 and the bolt 2. The center 1 is rendered integral with the support 4, which consists for instance of a box made of stamped sheet metal of any suitable shape fixed to the tube 5 of the frame of the bicycle, for instance, by means of an open collar 6 integral with the support 4 bent around the tube 5 and pressed against the opposite face of the support 4 by means of a nut 7 screwed on the screw-threaded pivot 8 projecting on the said support and passing through a suitable hole provided at the end of the said collar. The movable bolt 2 is mounted in such a manner as to be able to slide axially inside a box made of stamped sheet iron and preferably made of two parts 9, 9' riveted to each other and designed to inclose the locking mechanism, the box itself being also fixed to the tube 5 of the frame by means of a collar 6 and the nut 7 being screwed on to the screw-threaded pivot 8 integral with the front part 9 of the box. The end of the screw-threaded pivot 8 may be slightly expanded by punching after tightening of the nut 7 as shown in Fig. 4 with the object of preventing any moving either of the support 4 or of the box 9, 9'.

If it is desired to prevent the removal of said element in an absolutely certain manner, use may be made of the automatic mode of fixation shown in Figs. 6 and 7 as regards the box 9, 9', the arrangement of the support 4 remaining the same. According to this arrangement the free end of the collar 6 is provided with a member 6' having inclined teeth 6'', which member 6' passes through the opening 9$^x$ of 9' and engages with the obliquely cut edge 22' of the member 22 provided inside —9'— pressed upward by the spring 23 and held while still capable of oscillating slightly below the shoulder 24' of one of the rivets 24 which serve to fix the two parts 9, 9' of the box to each other.

Owing to this arrangement, it is enough to insert the member 6' through the opening 9ˣ as far as possible in order to close the collar 6. The edge 22' engages then one of the teeth 6'' under the action of the spring 23 and will effect an automatic locking of the whole arrangement.

A preferred form of construction of a locking mechanism according to the present invention is as follows:—

The bolt 2 which is capable of sliding axially inside the box 9' has a tendency of being brought in its opening position shown in dotted lines in Fig. 1 by the spring 10 fixed at one end to the projection 11 provided on the rod 12 of the bolt, and at the other end to the edge of the back part 9' of the box. By pressing the button 13 provided at the end of the rod 12, the bolt may be brought by hand in its closing position shown in full lines in Figs. 1 and 3 in which it is locked by the locking member as will be explained hereinafter.

The two extreme positions of the bolt are respectively limited by the collar 2' of the bolt and by the button 13 abutting against the edges of the box 9, 9'.

The locking mechanism consists of several flat pawls 14 bent at a right angle mounted so as to be capable of oscillating on the pivot 15 integral with 9' and forming, for instance, one of the rivets which assembles the two parts 9, 9' of the box. The pawls 14 provided with teeth 14' abut against the shoulder 2'' of the bolt 2 when the latter has been forced in its closed position, thereby preventing its return to the opening position. The engagement of the teeth of the pawls with the said shoulder is produced by the spring 16 placed in a suitable recess of the box 9, 9' and acting upon the ends 14'' of the said pawls. Several fixed plates 17 work in combination with the pawls 14, the said plates being also bent at a right angle, being preferably mounted on the same pivot 15 of the bolt and bearing with their ends 17' on one side against another pivot 18 forming another assembling rivet of the two parts 9, 9' of the box, and on the other side against the body of the bolt 2. The ends 17'' of the plates 17 are appreciably narrower than the ends 14'' of the pawls 14 in such a manner that the spring 16 bears only on the ends 14'' and not on the ends 17''. In the example shown in the drawings, there are three plates 17 and two pawls 14 inserted between the said plates.

The arrangement for guiding the key consists of a sleeve 19 with a slit 19' mounted so as to be capable of rotating between the walls of the box 9, 9', which serves to guide the key 20 in its movement of rotation after it has been introduced in the hole 21 of the lock. The flat key 20 may be of stamped sheet metal and capable of actuating the mechanism of the above described lock, and is provided with two projections 20' suitably arranged so as to act upon the internal edges of the ends 14'' of the pawls 14, while the body of the key is suitably recessed between the said projections and on their sides according to the positions occupied by the ends 17'' of the fixed plate 17. The said key inserted in the lock as shown in dotted lines in Fig. 3 may be rotated in the direction shown by the arrow, because owing to the recesses provided between the projections 20' of the key and on their sides, the latter can play freely between the ends 17'' of the fixed plate 17, while each projection 20' will act from the inside on the ends 14'' of the holes 14 and bring the latter in the position marked in dotted lines in Fig. 3, that is, with their teeth 14' out of engagement with the shoulder 2'' of the bolt, which under the action of the spring 10 is brought back into its opening position.

It is obvious that when the number of pawls 14 of the fixed plate 17 and the respective position of the said member is varied, it is also necessary to vary the relative position of the projection 20' of the key and of the recesses between them. It is therefore possible to have an extended series of keys.

According to the above described arrangement, the fixing in position of the pump is effected by placing the latter between the fixed center 1 and the pointed end of the bolt 2, and by pushing the latter by and into its closing position in which it remains fixed by the lock; in order to remove the pump it is necessary to use the key which brings the bolt back into its opening position. However, nothing prevents the use of any other locking device which would necessitate, for instance, a key for bringing the bolt into its closing position.

It is obvious that the present invention is not to be limited to the particular arrangements described above and illustrated, and it may be varied in many respects without departing from the spirit of the invention.

Having now particularly described and ascertained the nature of my said invention and in what manner the same is to be performed, I declare that what I claim is:—

1. A device for carrying the air pump for tires of bicycles and other vehicles, comprising a fixed center and a movable bolt between which the pump is placed in position, characterized in this that the fixing bolt is placed under the control of a lock, and can be opened only by means of a key which is suitable for operating the locking mechanism.

2. An arrangement for carrying the air pump for tires of bicycles and other vehicles as claimed in claim 1, characterized in this that the fixing bolt is slidingly mounted in a supporting box containing the locking mechanism, and is brought into its opening position by means of a spring, is brought by hand into its closing position, and is fixed in the latter by means of the fixing elements of the locking mechanism, while its release is effected by means of a key which acts upon the said locking elements and disengages them from the bolt which comes back into its opening position under the action of the spring.

3. In arrangement for supporting the air pump for tires of bicycles and other vehicles as claimed in claim 1, a locking mechanism characterized in this that the locking elements of the bolt in its closing position are formed by several retaining flat pawls bent at a right angle, mounted in such a manner as to be capable of oscillating on a single pivot and designed to engage under the action of resilient means against the shoulder of the bolt, said retaining pawls working in combination with several fixed plates combined in a certain manner with the pawls, while the key operating locking mechanism is provided with projections acting upon the ends of pivoting holes for the purpose of disengaging the latter from the shoulder of the lock, the said key having notches corresponding with the fixed plate with the object of allowing a free rotation of the key.

4. An arrangement for carrying the air pump for tires of bicycles and other vehicles and claimed in claim 1, an automatic arrangement for fixing the box shaped support of the fixed center and the bolt to the tube of the frame of the bicycle and like vehicles, characterized in this that the fixing collar is provided at its free end with a member provided with teeth designed to engage automatically when passing through the wall of the box shaped support with a resilient retaining tooth placed inside the said box and engaging with the teeth of the member integral with the collar.

In testimony that I claim the foregoing as my invention, I have signed my name.

ALESSANDRO MOSCA.